(12) United States Patent
Yin et al.

(10) Patent No.: US 10,620,760 B2
(45) Date of Patent: Apr. 14, 2020

(54) TOUCH MOTION TRACKING AND REPORTING TECHNIQUE FOR SLOW TOUCH MOVEMENTS

(71) Applicants: STMicroelectronics (Beijing) R&D Co. Ltd, Beijing (CN); STMicroelectronics Asia Pacific Pte Ltd, Singapore (SG)

(72) Inventors: Hang Yin, Beijing (CN); Cam Chung La, Singapore (SG); Janet Sun, Beijing (CN)

(73) Assignees: STMicroelectronics (Beijing) R&D Co. Ltd, Beijing (CN); STMicroelectronics Asia Pacific Pte Ltd, Singapore (CN)

( * ) Notice: Subject to any disclaimer, the term of this patent is extended or adjusted under 35 U.S.C. 154(b) by 347 days.

(21) Appl. No.: 15/803,054

(22) Filed: Nov. 3, 2017

(65) Prior Publication Data

US 2019/0113999 A1 Apr. 18, 2019

(30) Foreign Application Priority Data

Oct. 17, 2017 (CN) ............................ 2017 1 0964289

(51) Int. Cl.
*G06F 3/044* (2006.01)
*G06F 3/0488* (2013.01)
*G06F 3/041* (2006.01)

(52) U.S. Cl.
CPC ............ *G06F 3/044* (2013.01); *G06F 3/0416* (2013.01); *G06F 3/04186* (2019.05); *G06F 3/04883* (2013.01)

(58) Field of Classification Search
CPC .... G06F 3/044; G06F 3/04186; G06F 3/0416; G06F 3/04883; G06F 3/0418
See application file for complete search history.

(56) References Cited

U.S. PATENT DOCUMENTS

| | | | |
|---|---|---|---|
| 2010/0149115 A1* | 6/2010 | Park | G06F 3/04883 345/173 |
| 2012/0280931 A1* | 11/2012 | Stephanick | G06F 3/0236 345/173 |
| 2014/0340335 A1* | 11/2014 | Fleischmann | G06F 3/04883 345/173 |
| 2016/0077631 A1* | 3/2016 | Yamamoto | G06F 3/044 345/174 |
| 2016/0299633 A1* | 10/2016 | Su | G06F 3/044 |

* cited by examiner

*Primary Examiner* — Premal R Patel
(74) *Attorney, Agent, or Firm* — Crowe & Dunlevy

(57) ABSTRACT

A method includes upon sensing a touch to a first location on a touch display, reporting first coordinates of the touch. After sensing movement of the touch along a first path from the first location to a second location more than a tolerance distance away, intermediate coordinates of the touch along the first path that are not more than a cutoff distance away are reported such that there is a first gap between a last reported intermediate coordinate and the second location. After sensing movement of the touch along a second path from the second location to a third location more, second coordinates of the touch are reported, the second reported coordinates of the touch being a point along the first path that is calculated by subtracting the first gap from a distance between the first location and the third location, and then adding a first compensation difference thereto.

19 Claims, 4 Drawing Sheets

TOUCH MOTION TRACKING AND REPORTING TECHNIQUE FOR SLOW TOUCH MOVEMENTS

PRIORITY CLAIM

This application claims the priority benefit of Chinese Application for Patent No. 201710964289.2, filed on Oct. 17, 2017, the content of which is hereby incorporated by reference in its entirety to the maximum extent allowable by law.

TECHNICAL FIELD

This application is directed to the field of capacitive finger sensing, and, more particularly, to the use of a touch tolerance technique for smoothly tracking a slow moving touch.

BACKGROUND

Touch screens are prevalent in today's computing environment. Portable computers, desktop computers, tablets, smart phones, and smartwatches employ a touch screen to gain user input for navigation and control of these devices. Thus, discerning the intent of the user via touch inputs becomes an important feature of a touch screen device. Further, distinguishing actual touches to the touch screen by the user from noise and other non-input detections is also important for delivering meaningful communication of the user's intent through touches to the touch screen.

Typically, an input to a touch screen (e.g., a touch) is initiated by the user by placing a finger on the touch screen, which causes the touch screen to generate a variety of signals used by a touch screen controller to identify the location of the touch on the touch screen. For user interface applications (such as games) where a user places the finger on the touch screen, then without removing the finger, slides the finger to another location on the screen, smoothly tracking the motion of the user's finger is paramount. Typically, when the user's finger first comes into contact with the touch screen, the touch screen controller defines a tolerance range around that initial coordinate. As long as the user's finger does not move outside of the tolerance range defined around the initial coordinate, the touch screen controller reports only the initial coordinate.

When the user moves the finger out of the tolerance range, the touch screen controller begins to report new touch coordinates. To make the transition from inside the tolerance range to outside the tolerance range less sudden (and thus to help avoid jerky user interface response), the touch screen controller may report intermediate coordinates inside the tolerance range and between the initial coordinate and the current coordinate by applying suitable weights to the initial coordinate and the current coordinate. This technique, however, may be poor at transitioning from inside the tolerance range to outside the tolerance range when the user's finger is moved slowly, resulting in undesired jerky user interface response, which can be particularly unpleasant to the user for applications where fine movement is desired, such as drawing applications and first person shooting games.

Therefore, further development of touch motion tracking techniques, particularly for use when the touch motion is slow, is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is a method including upon sensing a touch of an object to a first location on a touch display, report first coordinates of the touch to an output, and after sensing movement of the touch along a first path on the touch display from the first location to a second location more than a tolerance distance away from the first location, reporting at least some intermediate coordinates of the touch along the first path that are not more than a cutoff distance away from the first location to the output such that there is a first gap between a last reported intermediate coordinate and the second location, the cutoff distance being less than the tolerance distance. After sensing movement of the touch along a second path on the touch display from the second location to a third location more than the tolerance distance away from the first location, second coordinates of the touch are reported to the output, the second reported coordinates of the touch being a point along the first path that is calculated by subtracting the first gap from a distance between the first location and the third location, and then adding a first compensation difference thereto.

The first gap is calculated as a difference between first and second distances, the first distance being from the first coordinates to the second location, the second distance being from the first coordinates to the last reported intermediate coordinate.

The method may also include calculating a second gap as a distance between the second reported coordinates and the second location, and after sensing movement of the touch along a third path on the touch display from the third location to a fourth location spaced apart from the third location, third coordinates of the touch are reported to the output, the third reported coordinates of the touch being a point along the second path that is calculated by subtracting the second gap from a distance between the first location and fourth location, and then adding a second compensation difference thereto.

The second gap is calculated as a difference between first and second distances, the first distance being from the first coordinates to the third location, the second distance being from the first coordinates to the second reported coordinates.

The first and second compensation differences may be equal.

The method may also include calculating a third gap as a distance between the second reported coordinates and the second location, and after sensing movement of the touch along a fourth path on the touch display from the fourth location to a fifth location spaced apart from the fourth location and more than the tolerance distance away from the first location, reporting fourth coordinates of the touch to the output. The fourth coordinates of the touch are a point along the fourth path that is calculated by subtracting the third gap from a distance between the first location and the fifth location, and then adding a third compensation difference thereto.

The third gap is calculated as a difference between first and second distances, the first distance being from the first coordinates to the fourth location, the second distance being from the first coordinates to the third reported coordinates.

The first, second, and third compensation differences may be equal.

After reporting the fourth coordinates of the touch, actual coordinates of the touch may be reported to the output based upon further sensing of movement of the touch.

In some instances, the at least some intermediate coordinates are acquired from a touch data. In other instances, the at least some intermediate coordinates are calculated as a function of the first coordinates and coordinates of the second locations. In still further instances, the at least some intermediate coordinates are calculated by applying a weighted average to the first coordinates and coordinates of the second location.

A touch screen controller operable with a touch display is also disclosed herein, and functions to perform the methods as described above. The touch screen controller includes input circuitry configured to receive data from the touch display, and processing circuitry. The processing circuitry is configured to upon sensing a touch of an object to a first location on the touch display, report first coordinates of the touch to an output, and after sensing movement of the touch along a first path on the touch display from the first location to a second location more than a tolerance distance away from the first location, report at least some intermediate coordinates of the touch along the first path that are not more than a cutoff distance away from the first location to the output such that there is a first gap between a last reported intermediate coordinate and the second location, the cutoff distance being less than the tolerance distance. After sensing movement of the touch along a second path on the touch display from the second location to a third location more than the tolerance distance away from the first location, second coordinates of the touch are reported to the output, the second reported coordinates of the touch being a point along the first path that is calculated by subtracting the first gap from a distance between the first location and the third location, and then adding a compensation difference thereto.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
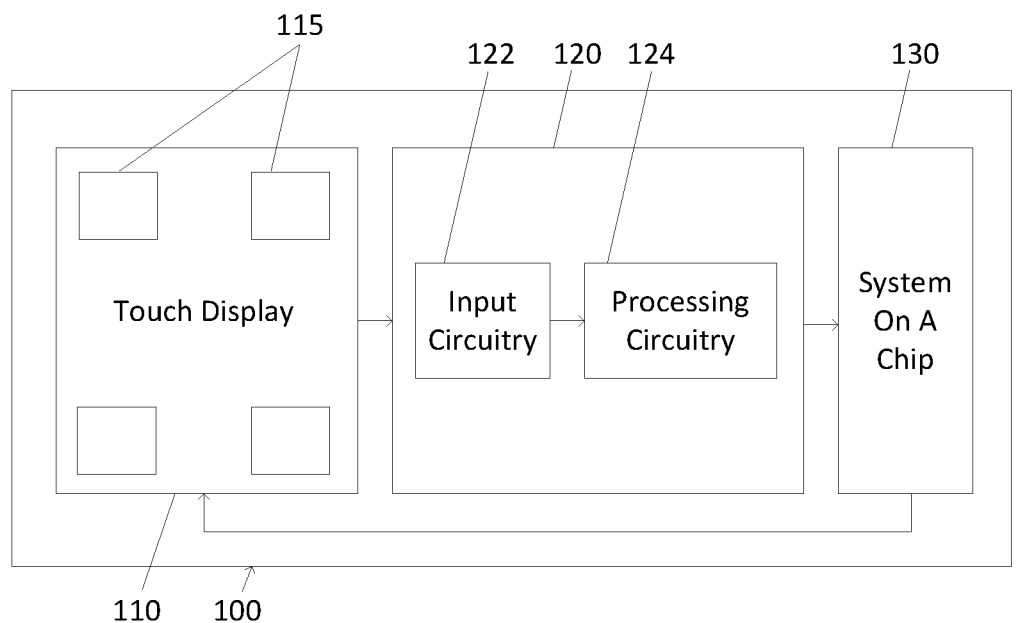
FIG. 1 is a block diagram of a touch screen device in accordance with this disclosure.

FIG. 1 is a functional block diagram of a touch screen device 100 according to an embodiment as disclosed herein. The touch screen device 100 may be a smartphone, tablet, portable computer, smartwatch, wearable, or other device. The touch screen device 100 includes a tactile input surface, such as a touch display 110 coupled to a touch controller 120. The touch screen display 110 is designed to receive touch inputs from a user through a user's fingers. The touch screen display 110 includes touch screen sensors 115 that are configured to detect touches (or other input actions such as hover or gesture motions) to the touch screen display 110. As a touch is sensed, the touch screen controller 120 may receive touch signals from the sensors 115 and analyze the touch signal(s). This interpretation may then be used by a system on a chip (SOC) 130 to manipulate operations respect to applications and programs executing on the touch screen device 100.

In one embodiment, the sensors 115 may be a single type of sensing technology or sensor, such as self-capacitance sensors or mutual capacitance sensors, to be utilized in the touch screen device 100 to detect input events. In some cases, the same sensors 115 may be used for both self-capacitance sensing and mutual capacitance sensing.

Where the sensors 115 are capacitive sensors, the sensors 115 are typically formed as an array of sensors from transparent patterned orthogonal conductive lines (not shown) formed on the surface, or integrated as part of, the touch display 110. The intersections of the conductive lines form the individual touch sensors 115, and the touch screen controller 120 scans these sensing points and processes the generated signals to identify the location and type of a touch point or points.

Figure 2:
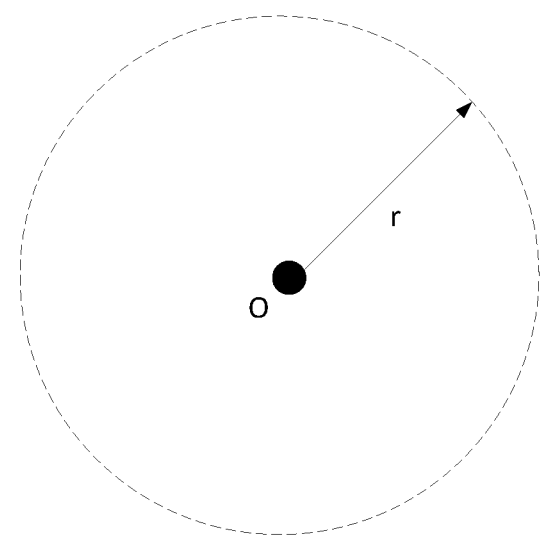
FIG. 2 is a touch coordinate graph showing an initial touch and generation of a tolerance threshold about the initial touch.

A technique for tracking movement of an initial touch and slow movement of the touch across the touch screen display 110 will now be described. Initially, as shown in FIG. 2, an initial touch at point O is registered to the touch screen display 110 by the touch screen controller 120, and reported to the SOC 130. The touch screen controller 120 defines a tolerance threshold of r about point O, such that movement of the finger (or other object) performing the touch from point O to another location within the tolerance threshold r will not be reported to the SOC 130.

Figure 3:
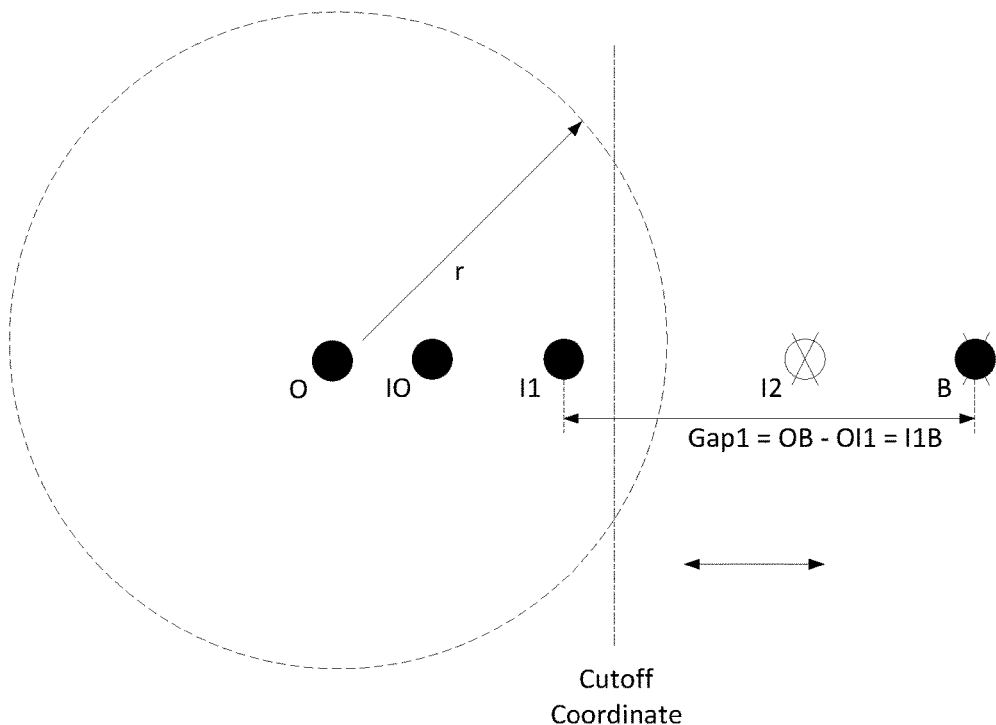
FIG. 3 is a touch coordinate graph showing an initial touch and movement to a first touch location from the initial touch together with reported intermediate touch coordinates, in accordance with techniques and methods described herein.

As the finger performing the touch moves along a first path from point O to point B (which is outside the tolerance threshold r), as shown in FIG. 3, the touch screen controller 120 registers and reports intermediate coordinates I0 and I1 to the SOC 130. However, it is noted that intermediate coordinate I2 is not reported to the SOC 130, as it is beyond a threshold distance set by the cutoff coordinate, as shown. The gap or distance between the last reported intermediate coordinate I1 and point B can be calculated as Gap1=OB−OI1=I1B.

Figure 4:
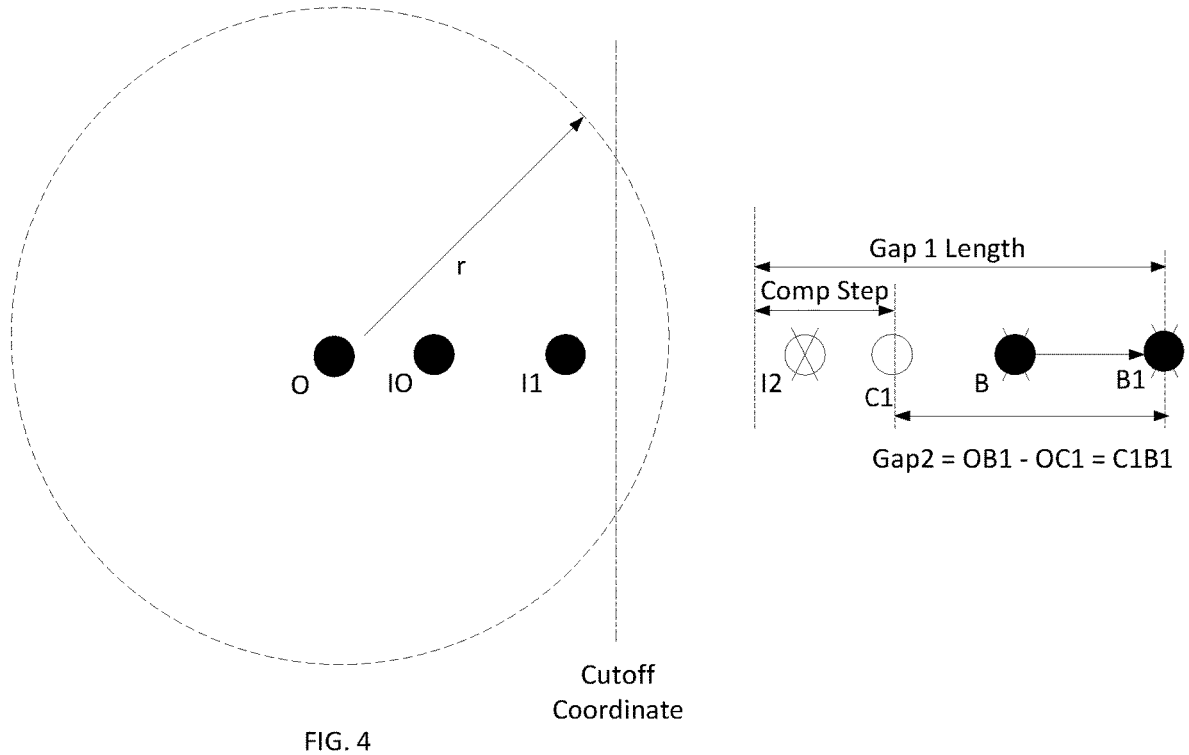
FIG. 4 is a touch coordinate graph showing movement to from the first touch location to a second touch location together with reported intermediate touch coordinates, in accordance with techniques and methods described herein.

If the finger stays at point B, the touch screen controller 120 continues to report point I1 to SOC 130. However, if the finger performing the touch moves along a second path from point B to point B1, as shown in FIG. 4, intermediate coordinate C1 is calculated and reported by the touch screen controller 120 to the SOC 130. To calculate the intermediate coordinate C1, the distance between the initial touch O and the intermediate coordinate C1 is calculated as OC1=OB1−Gap1+Compensation Step. Gap1, as calculated above, is I1B. Therefore, the distance between the initial touch O and the intermediate coordinate C1 is calculated as OC1=OB1−I1B+Compensation step. The compensation step is an extra distance added every time the touch moves, and functions to slowly close the gap between the last reported coordinate and the real coordinate. The current gap or distance between the last reported coordinate C1 and the real coordinate B1 is then calculated as Gap2=OB1−OC1=C1B1.

Figure 5:
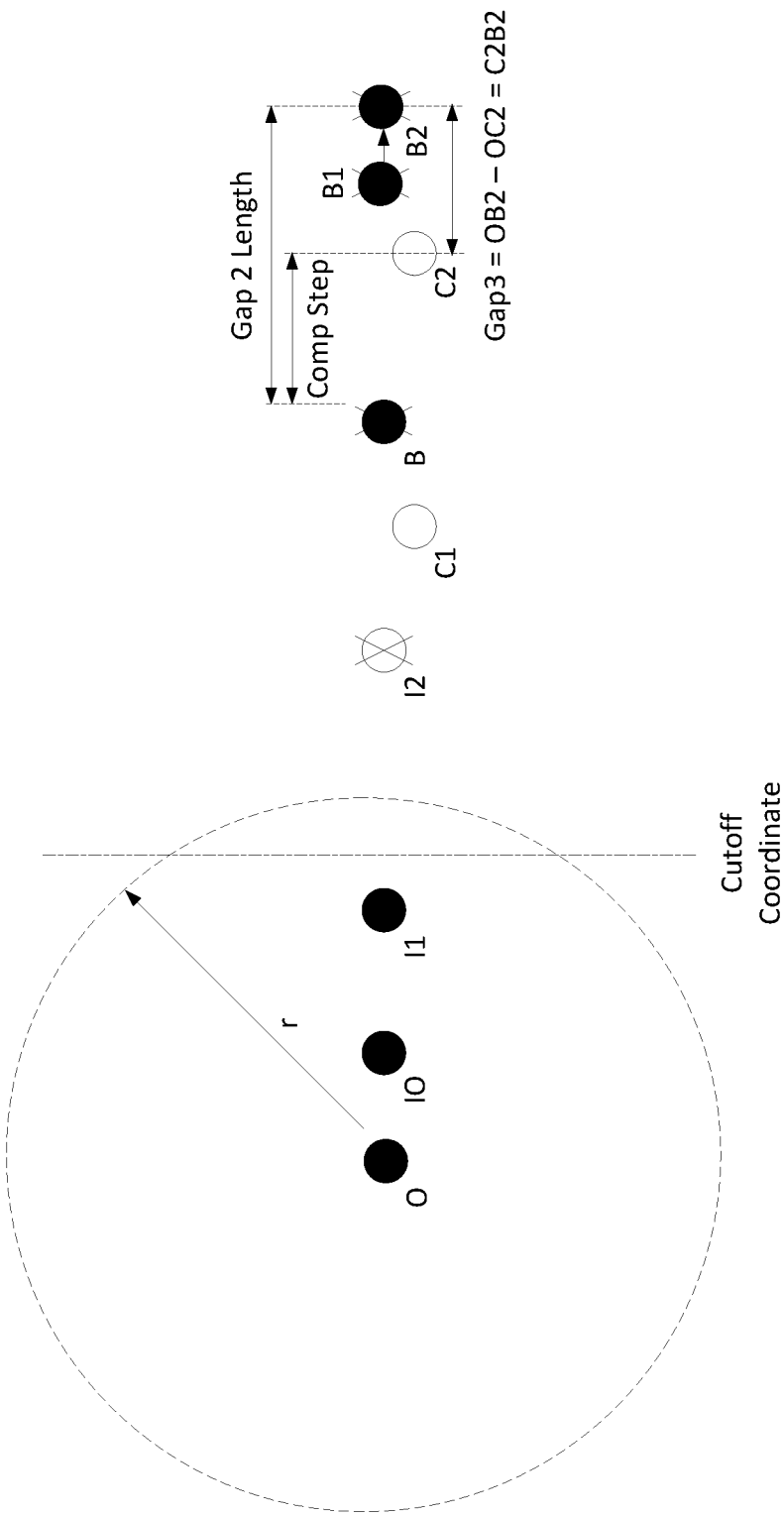
FIG. 5 is a touch coordinate graph showing movement to from the second touch location to a third touch location together with reported intermediate touch coordinates, in accordance with techniques and methods described herein.

If the finger stays at point B1, the touch screen controller 120 continues to report point C1 to SOC 130. However, if the finger performing the touch moves along a third path from point B1 to point B2, as shown in FIG. 5, intermediate coordinate C2 is calculated and reported by the touch screen controller 120 to the SOC 130. To calculate the intermediate coordinate C2, the distance between the initial touch O and the intermediate coordinate C2 is calculated as 0C2=OB2−Gap2+Compensation Step. Gap2, as calculated above, is C1B1. Therefore, the distance between the initial touch O and the intermediate coordinate C2 is calculated as OC2=OB2−C1B1+Compensation step. The current gap or distance between the last reported coordinate C2 and the real coordinate B2 is then calculated as Gap3=OB2−OC2=C2B2.

Figure 6:
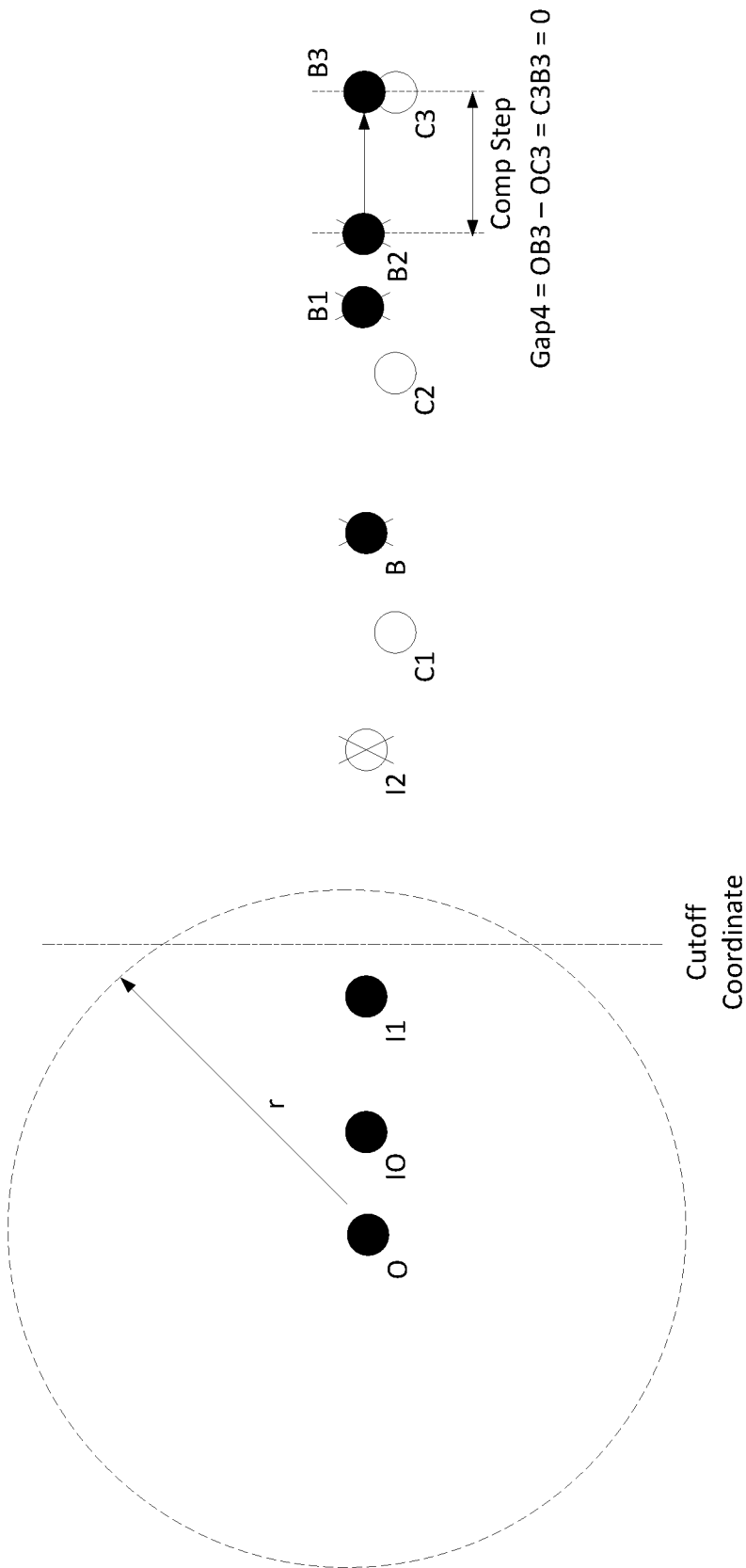
FIG. 6 is a touch coordinate graph showing movement to from the third touch location to a fourth touch location together with reported intermediate touch coordinates, in accordance with techniques and methods described herein.

If the finger stays at point B2, the touch screen controller 120 continues to report point C2 to SOC 130. However, if the finger performing the touch moves along a fourth path from point B2 to point B3, as shown in FIG. 6, intermediate coordinate C3 is calculated and reported by the touch screen controller 120 to the SOC 130. To calculate the intermediate coordinate C3, the distance between the initial touch O and the intermediate coordinate C3 is calculated as OC3=OB3−Gap3+Compensation Step. Gap3, as calculated above, is C2B2. Therefore, the distance between the initial touch O and the intermediate coordinate C3 is calculated as OC3=OB3−C2B2+Compensation step. It can be noted here that coordinate C3 is at the same location as point B3, meaning that the current gap or distance between the last reported coordinate C3 and the real coordinate is Gap4=OB3−OC3=C3B3=0. Therefore, at this point, the reported coordinate and the real coordinate match, and so long as the touch remains (the finger remains in contact with the touch display 110), the real coordinate will be reported by the touch screen controller 120 to the SOC 130.

Through proper selection of the cutoff coordinate and the compensation step, no lag or coordinate reporting speed change will be noticed by the user. It is noted here that the various compensation steps discussed above may each have the same value, may each have different values, or some may have different values while some have the same values.

It should be appreciated and understood that the techniques described above for the generation of intermediate coordinates in steps until the reported touch coordinate matches the actual touch coordinate are a set of rules to be followed by the processing circuitry 124 so as to enable smooth motion tracking of a slow moving touch, such that the user interface presented to the user by the SOC 130 reacts fluidly and not in a "jerky" fashion. Prior art motion tracking techniques do not permit this fluid response and smooth motion tracking, meaning that the execution of the rules above provide for new functionality not previously available in such devices. Thus fluid response is particularly advantageous for drawing applications and for first person shooter games, where fluid user interface response is paramount. In fact, to illustrate how much of an improvement to the operation of the device and the SOC 130 the rules and techniques make, user interface fluidity for such first person shooter and drawing applications may improve to the point where a smartphone using a slower SOC, but using these rules and techniques, has a user interface that responds more fluidly in such applications than a smartphone using a faster SOC but not using these rules and techniques.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A method, comprising:
upon sensing a touch of an object to a first location on a touch display, reporting first coordinates of the touch to an output;
after sensing movement of the touch along a first path on the touch display from the first location to a second location more than a tolerance distance away from the first location, reporting at least some intermediate coordinates of the touch along the first path that are not more than a cutoff distance away from the first location to the output such that there is a first gap between last reported intermediate coordinates and the second location, the cutoff distance being less than the tolerance distance; and
after sensing movement of the touch along a second path on the touch display from the second location to a third location more than the tolerance distance away from the first location, reporting second coordinates of the touch to the output, the second reported coordinates of the touch being a point along the first path that is calculated by subtracting the first gap from a distance between the first location and the third location, and then adding a first compensation difference thereto.

2. The method of claim 1, wherein the first gap is calculated as a difference between first and second distances, the first distance being from the first coordinates to the second location, the second distance being from the first coordinates to the last reported intermediate coordinates.

3. The method of claim 1, further comprising:
calculating a second gap as a distance between the second reported coordinates and the second location; and
after sensing movement of the touch along a third path on the touch display from the third location to a fourth location spaced apart from the third location, reporting third coordinates of the touch to the output, the third reported coordinates of the touch being a point along the second path that is calculated by subtracting the second gap from a distance between the first location and fourth location, and then adding a second compensation difference thereto.

4. The method of claim 3, wherein the second gap is calculated as a difference between first and second distances, the first distance being from the first coordinates to the third location, the second distance being from the first coordinates to the second reported coordinates.

5. The method of claim 3, wherein the first and second compensation differences are equal.

6. The method of claim 3, further comprising:
calculating a third gap as a distance between the second reported coordinates and the second location; and
after sensing movement of the touch along a fourth path on the touch display from the fourth location to a fifth location spaced apart from the fourth location and more than the tolerance distance away from the first location, reporting fourth coordinates of the touch to the output;
the fourth coordinates of the touch being a point along the fourth path that is calculated by subtracting the third gap from a distance between the first location and the fifth location, and then adding a third compensation difference thereto.

7. The method of claim 6, wherein the third gap is calculated as a difference between first and second distances, the first distance being from the first coordinates to the fourth location, the second distance being from the first coordinates to the third reported coordinates.

8. The method of claim 6, wherein the first, second, and third compensation differences are equal.

9. The method of claim 6, further comprising after reporting the fourth coordinates of the touch, reporting actual coordinates of the touch to the output based upon further sensing of movement of the touch.

10. The method of claim 1, wherein the at least some intermediate coordinates are acquired from a touch data.

11. The method of claim 1, wherein the at least some intermediate coordinates are calculated as a function of the first coordinates and coordinates of the second locations.

12. The method of claim 1, wherein the at least some intermediate coordinates are calculated by applying a weighted average to the first coordinates and coordinates of the second location.

13. A touch screen controller operable with a touch display, the touch screen controller comprising:
input circuitry configured to receive data from the touch display; and
processing circuitry configured to:
upon sensing a touch of an object to a first location on the touch display, report first coordinates of the touch to an output;
after sensing movement of the touch along a first path on the touch display from the first location to a second location more than a tolerance distance away from the first location, report at least some intermediate coordinates of the touch along the first path that are not more than a cutoff distance away from the first location to the output such that there is a first gap between last reported intermediate coordinates and the second location, the cutoff distance being less than the tolerance distance; and
after sensing movement of the touch along a second path on the touch display from the second location to a third location more than the tolerance distance away from the first location, report second coordinates of the touch to the output, the second reported coordinates of the touch being a point along the first path that is calculated by subtracting the first gap from a distance between the first location and the third location, and then adding a compensation difference thereto.

14. The touch screen controller of claim 13, wherein the processing circuitry is configured to calculate the first gap as a difference between first and second distances, the first distance being from the first coordinates to the second location, the second distance being from the first coordinates to the last reported intermediate coordinates.

15. The touch screen controller of claim 13, wherein the processing circuitry is further configured to:
calculate a second gap as a distance between the second reported coordinates and the second location; and
after sensing movement of the touch along a third path on the touch display from the third location to a fourth location spaced apart from the third location, report third coordinates of the touch to the output, the third reported coordinates of the touch being a point along the second path that is calculated by subtracting the second gap from a distance between the first location and fourth location, and then adding the compensation difference thereto.

16. The touch screen controller of claim 15, wherein the processing circuitry is configured to calculate the second gap as a difference between first and second distances, the first distance being from the first coordinates to the third location, the second distance being from the first coordinates to the second reported coordinates.

17. The touch screen controller of claim 15, wherein the processing circuitry is further configured to:
calculate a third gap as a distance between the second reported coordinates and the second location;
after sensing movement of the touch along a fourth path on the touch display from the fourth location to a fifth location spaced apart from the fourth location and more than the tolerance distance away from the first location, report fourth coordinates of the touch to the output; and
the fourth coordinates of the touch being a point along the fourth path that is calculated by subtracting the third gap from a distance between the first location and the fifth location, and then adding the compensation difference thereto.

18. The touch screen controller of claim 17, wherein the processing circuitry is configured to calculate the third gap as a difference between first and second distances, the first distance being from the first coordinates to the fourth location, the second distance being from the first coordinates to the third reported coordinates.

19. The touch screen controller of claim 17, wherein the processing circuitry is configured to, after reporting the fourth coordinates of the touch, report actual coordinates of the touch to the output based upon further sensing of movement of the touch.

* * * * *